UNITED STATES PATENT OFFICE 2,588,076

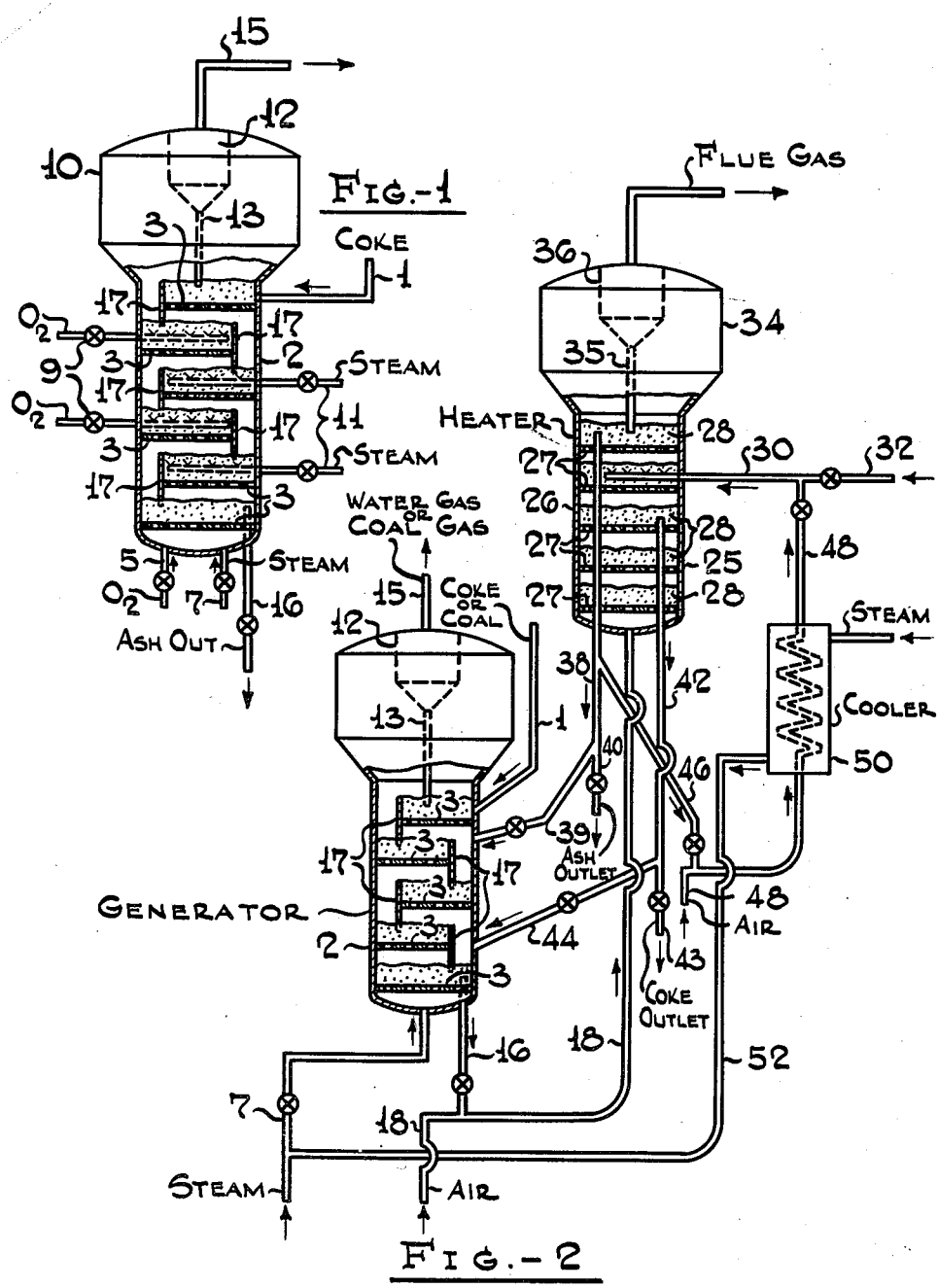

METHOD FOR GASIFYING FUELS

Edwin J. Gohr, Summit, N. J., assignor to Standard Oil Development Company, a corporation of Delaware Application December 28, 1945, Serial No. 637,616

3 Claims. (Cl. 48—206)

The present invention relates to the art of producing valuable fuels. More particularly, the present invention relates to improvements in the generation of heat and the production of volatile fuels from solid carbonaceous materials, such as coal, coke, peat, tar sands, oil shales, and the like.

It has been long known that solid fuel materials, such as coke, coal, and the like, may be converted into more valuable gaseous fuels which can be more easily handled and more efficiently used. Producer gas, coal gas and water gas processes are well known and widely practiced. However, any of these processes has certain drawbacks. Producer gas has a low heating value, while the production of coal gas or water gas either requires discontinuous operation or involves inefficient conversion of the carbon available into heat or combustible gases. The application of the so-called fluid solids technique to the gasification or carbonization of solid carbonaceous materials has made the operation fully continuous and brought a number of highly desirable advantages. However, partly as a result of the continuous feed and withdrawal of fresh and spent carbonaceous material to and from a fluidized highly turbulent bed of solids, it is unavoidable that substantial proportions of carbonaceous materials are withdrawn from the reaction zone before the desired conversion into gaseous fuels is complete. Thus, extensive recycling is required, resulting in an inefficient utilization of reactor space.

It is an important object of my present invention to provide means by which the conversion of solid carbonaceous materials into heat and/or fluid fuels may be accomplished continuously in a fluidized solids conversion zone and by which the withdrawal of unconverted feed material may be controlled and reduced to any desired level.

I have found that this and other objects and advantages may be accomplished quite generally by restricting the free circulation of fluidized solids particularly in the direction of the path of the fluidized solids feed through a fluidized reaction zone and withdrawing solids from a point removed from the solids feed inlet along said path through the reaction zone. In accordance with a preferred embodiment of my invention, I restrict the free circulation of the fluidized solids with the aid of perforated plates or grids subdividing the reaction zone into sections and restricting solids flow essentially to one direction from section to section. For example, I may feed solid finely-divided carbonaceous material to the top of a vertical elongated reaction zone subdivided by one or more perforated plates into two or more sections in which the solid carbonaceous material is subjected to the desired reaction in the form of a fluidized mass of solids maintained with the aid of fluidizing gas injected below one or more of the various perforated plates. The finely-divided solids filter through the reaction zone and may be withdrawn at a point separated by one or more perforated plates from the solids inlet. In this manner, only solids are withdrawn which were subjected to the desired reaction conditions for the time contemplated. The effect of the plate perforations may be supplemented by suitable overflow connections facilitating the flow of solids from section to section in one direction only.

My invention is equally applicable to the production of fuel gases, such as producer gas or water gas from carbonized fuels, such as coke, by means of steam and to the production of coal gas and other carbonization products by the coking of carbonizable solid fuels, as will appear more clearly hereinafter.

My new process combines the great advantages of the fluid solids technique, such as ease of solids handling, perfect heat distribution throughout the reaction zone and flexibility of operation with a greatly improved utilization of reactor space, resulting in increased outputs of valuable products per unit of time and reactor space. These and other advantages will be fully understood from the more detailed description hereinafter, in which reference will be made to the accompanying drawing wherein Fig. 1 is a semi-diagrammatic view in sectional elevation of an apparatus for carrying out the present process in one conversion zone; and Fig. 2 is a semi-diagrammatic view in sectional elevation of an apparatus for carrying out the present process in two separate zones.

Referring now to Fig. 1, finely divided carbonaceous solids, such as coke, coal or the like are fed by means of a standpipe, a star or screw-feeder or any other conventional feeding device (not shown) through line 1 to a vertical substantially cylindrical elongated reaction zone 2 which is subdivided by perforated grids 3 into several sections in whch the solids are maintained in the form of a dense fluidized mass of solids with the aid of gas and/or vapors admitted through lines 5 and/or 7 to the bottom of reactor 2. The finely-divided solid material may have a particle size of the order of below 50 mesh, or even less than 200 mesh, although small lumps up to ¼ or ½ inch size may be used. If desired, additional gases may be admitted at various points along the height of reactor 2 through lines 9 and/or 11. Good fluidization may be achieved at superficial gas velocities ranging from about 0.5 ft. per second to about 10 ft. per second or higher, depending on the particle size of the solids charged. Volatile products of reaction pass overhead from the fluidized mass of solids into an enlarged section 10 of reactor 2 wherein most of the entrained solids are separated and returned to the reaction zone as a result of the reduced superficial velocity of the gases. From section 10 the vaporous or gaseous reaction products pass into gas-solids separator 12 which may be of the electrical and/or centrifugal type. Solid fines are returned from separator 12 through line 13 to the reaction zone 2 while volatile products now substantially free of solids are withdrawn through line 15 and passed to further processing or product recovery.

Spent solids are withdrawn from any one of the lower sections, preferably the lowest section of reaction zone 2, through line 16. If desired, overflows 17 may be arranged between some or all of the sections to facilitate the downward flow of the fluidized solids. These overflow pipes 17 may be arranged to cooperate with such fluidization conditions of particle size, solids feed, gas velocity and amounts in reactor 2 as will cause the formation of a dense fluidized solids phase and a dilute phase of solids fines suspended in gases above each grid 3 with well-defined upper levels of the dense phases in each reactor section as it is indicated in the drawing. However, the fluidization conditions may also be so controlled that the entire reaction zone 2 is filled with a fluidized solids phase of substantially uniform density forming only a single well-defined upper level above the uppermost grid 3 where the gases enter the enlarged zone 10 and the change in superficial velocity causes a relatively steep drop in the density of the suspension. In either case the perforated grids 3, while restricting free vertical circulation of solids over the entire length of reaction zone 2, permit sufficient downward filtration of the solids through the grid perforations to establish a definite and continuous downward movement of solids from the uppermost to the lowermost reactor section. When the particle size of the solids feed and the diameter of the grid perforations are properly correlated, overflow pipes 17 may be entirely dispensed with. There may be some carry-over of solids from lower to upper sections of the reaction zone caused by the countercurrent gas flow. However, it will be appreciated that the solids withdrawn through line 16 cannot contain any feed material which has not been subjected to reaction conditions for the intended minimum reaction time which is determined by the length of the reaction zone 2.

Reactor 2 may be used for the production of coal gas and volatile carbonization products such as hydrocarbon oils, ammonia, tar, tar products and coke. For this purpose, a carbonizable material, such as carbonization coal, oil shale, tar sands or the like, is continuously supplied through line 1 and an oxidizing gas, such as air and/or oxygen, is injected through line 5 and, if desired, through one or more of lines 9. The volumes of oxidizing gas are carefully controlled so as to produce just enough heat by combustion to supply that required for the desired carbonization of the solid carbonaceous material. If desired, an auxiliary inert fluidizing gas, such as coal gas, flue gas or the like, may be added through lines 7 and/or 11 to assist in the fluidization of the solids in reactor 2. Instead of heat generated by partial combustion within reactor 2, heat for carbonization may be supplied by inert fluidizing gas preheated to temperatures sufficiently high to cause carbonization. It will be readily appreciated that the entire charge of reactor 2 may be easily maintained at a uniform carbonization temperature which may fall within the range of 1000°–2200° F., preferably of 1200°–1400° F., to be converted on its path through reactor 2 into volatile carbonization products withdrawn through line 15 and coke or coky residue withdrawn through line 16 in a form substantially free of volatilizable constituents. In general, this result may be accomplished by supplying about 0.3 cu. ft. to 1.0 cu. ft. of oxygen per pound of carbonizable material charged at residence times of solids in the reactor varying from 3 to 30 minutes.

When reactor 2 is to be used for the production of fuel gases comprising CO and $H_2$, such as water gas or producer gas, the solid carbonaceous charge which now may include coke or other solid carbonization residue is supplied to reactor 2, as described above, and reacted with steam supplied through lines 7 and/or 11. The heat required for the gasification reaction may be generated by partial combustion within reactor 2 with the aid of an oxidizing gas, such as air and/or oxygen, supplied through lines 5 and/or 9 in amounts just sufficient for the purpose. Steam and oxidizing gas may either be supplied simultaneously or alternately in a make and blow manner. The combined effects of gasification and combustion cause substantially complete conversion of the carbonaceous charge on its path through reactor 2 into gaseous fuels withdrawn upwardly through line 15 and ash withdrawn downwardly through line 16. When the production of water gas substantially free of inert constituents, such as a feed gas suitable for the catalytic synthesis of hydrocarbons from CO and $H_2$ is desired, oxygen or air enriched with oxygen is preferably used as the oxidizing gas. Gasification temperatures may vary between 1400° and 2400° F. but are preferably kept between about 1600° and 1800° F. Good results are generally obtained by supplying 0.5 lb. to 3.0 lbs of steam and 7 cu. ft. to 11 cu. ft. oxygen per pound of gasifiable solids charged at solids residence times varying between about 1 and 5 minutes.

It will be understood that both carbonization and gasification reactions may be operated as fully continuous processes by continuously supplying solid and gaseous reactants and continuously withdrawing solid and gaseous reaction products. If desired, the supply of gaseous reactants through lines 5, 7, 9 and 11 may be so controlled that they are substantially consumed before reaching the upper reactor section or sections which may in this case serve as preheating zone or zones for the carbonaceous feed. Obviously, the gaseous and/or solid feed materials may also be preheated to any desired temperature, particularly for starting purposes. Moreover, the various sections of reactor 2 may be arranged in two or more separate reactors of suitable design and arrangement.

In accordance with another embodiment of my invention illustrated in Fig. 2 of the drawing, the conversion of solid carbonaceous material into volatile fuels on the one hand and the generation of the heat required for this conversion on the other hand are carried out with particular advantage in two separate vessels. The system illustrated in Fig. 2 essentially comprises a fluid solids reactor 2 and a fluid solids heater 25. Design and operation of reactor 2 are essentially as described in connection with Fig. 1, like reference numerals designating similar parts.

Referring now to the production of fuel gases such as water gas from solid carbonaceous material in the system of Fig. 2, finely-divided carbonizable solids, such as coke or coal, having a particle size as described above, are fed through line 1 to an upper or intermediate section of reactor 2 and maintained therein in a fluidized state with the aid of steam and, if desired, other fluidizing gas supplied through line 7. Amounts of steam varying from 0.6 lb. to 2.0 lbs. per pound of solids charged are sufficient for this purpose. The gasification temperatures may vary between about 1400° and 2400° F. and are preferably kept between about 1600° and 1800° F. Heat required for gasification is supplied in the form of sensible heat of solids circulated to reactor 2 from heater 25, as will appear more clearly hereinafter. The carbonaceous solids filtering down through perforated plates 3 and/or overflow pipes 17 are increasingly gasified countercurrent to the steam and fluidizing gas, a gas mixture containing CO and $H_2$ being withdrawn overhead through line 15.

Solid fluidized gasification residue having a carbon concentration of not more than about 2%, preferably less than about 1%, is withdrawn from the lowest and/or an intermediate reactor section through standpipe 16, mixed with an oxidizing gas in line 18 and passed under the pressure of the denser fluidized column in pipe 16, to the bottom portion of heater 25. This heater may be of any conventional design adapted for the combustion of finely-divided solid carbonaceous materials by means of an oxidizing gas, in the form of a dense fluidized mass of solids exhibiting the phenomenon of hindered settling. However, in order to accomplish most efficient combustion and heat generation by substantially complete conversion of reacted carbon to $CO_2$, the combustion is preferably carried out in at least two successive combustion zones in one of which the feed material of highest carbon concentration is subjected to combustion to form $CO_2$ and CO while in at least one subsequent combustion zone the carbon concentration of the solids is kept low enough to prevent reduction of $CO_2$ formed to CO and to promote substantially complete combustion of CO to $CO_2$ by surface action, if desired, with the aid of added oxidizing gas. To accomplish this effect, heater 25 is shown to consist of an elongated subtantially cylindrical combustion zone subdivided by a member of spaced perforated plates or grids 27 into a number of superimposed combustion sections 28.

In operation, the suspension of solid relatively high-carbon content gasification residue in oxidizing gas enters the lowest combustion section 26 through the lowest distributing grid 27 and combustion to CO and $CO_2$ begins in a dense bed of solids fluidized by the oxidizing and combustion gases. As combustion proceeds, solids of decreasing carbon concentration are carried over from section to section to establish therein fluidized beds of decreasing carbon concentration so that the upper sections contain solids containing not more than 1.0%, and preferably less than 0.2%, of carbon. There may be sufficient unreacted oxygen left in the combustion gases to permit complete combustion of CO to $CO_2$ in the upper beds 28 in contact with the hot solids of low carbon content. However, normally it is advisable to supply fresh oxidizing gas through line 30 to one of these upper beds, as will appear more clearly hereinafter. When the carbon content in the upper low-carbon combustion section rises too high as a result of carbon carried over from lower high-carbon sections, the effect may be compensated by the addition from lines 32 and 30 of extraneous non-carbonaceous solids, such as sand, ash, clay or solids catalytically promoting the combustion reaction, such as iron oxide, iron ore, high-iron clays, and the like, or mixtures of these materials. The temperatures within combustion zone 26 may vary between about 1500° and 2500° F., with temperature levels of about 1600°–2000° F. in the lower sections of relatively high carbon concentration and about 1800°–2400° F. in the upper sections of relatively low carbon concentration.

Combustion gases consisting essentially of $CO_2$ and unreacted components of the oxidizing gas pass from cylindrical zone 26 into an enlarged section 34 where most of the entrained solids drop out due to the reduced superficial gas velocity. Further suspended fines are separated in conventional gas-solids separator 36 and returned to the combustion zone 26 through line 35.

Fluidized solids of highest temperature and lowest carbon concentration may be withdrawn through standpipe 38 from the uppermost combustion section 28 of heater 26, and passed substantially at the temperature of this combustion section through line 39 to one of the upper sections of reactor 2 in amounts sufficient to supply all or part of the heat required therein for gasification. Further amounts of solids contained in pipe 38 may be discarded through line 40. Fluidized solids of equal or slightly higher carbon concentration than withdrawn through line 38 are withdrawn through standpipe 42, preferably from, and substantially at the temperature of, an intermediate combustion section 28. They may be passed through line 44 to a lower section of reactor 2 to supply additional heat required therein. If desired, they may be discarded in part through line 43. It may be desirable to control the temperature of the low-carbon solids at the level desired for heat supply in reactor 2. For this purpose, a portion of the solids in pipe 38 is passed through line 46, suspended in added fluidizing gas, preferably an oxidizing gas, such as air, in line 48 and returned through a heat withdrawal device such as steam boiler or heater 50, and line 39 to the uppermost section 28 of heater 25. The steam produced in boiler 50 may be supplied through lines 52 and 7 to reactor 2.

From the foregoing, it will be understood that a system of the type illustrated in Fig. 2 affords a fully continuous process of greatest flexibility and adaptability to raw materials treated and products desired. This embodiment of my invention permits of many modifications. While only a single reactor is shown in Fig. 2, two or more reactors of the type of reactor 2 may be combined with a single heater to carry out simultaneously different reactions such as carbonization and gasification of carbonized solids by suitable circulation of solid feed materials and heat-carrying solids through the system and employing proper types and amounts of gaseous reactants, such as steam and oxidizing gas. In the latter case, it may be desirable to feed carbonization residue from a coker to the generator and to supply the heat for both carbonization and gasification by burning gasification residue as outlined above and feeding hot combustion residue to the carbonization and gasification zones in suitable proportions. Separate vessels may be provided for each individual section or several combined sections of reactor 2 and heater 25. It may also be desired to circulate the extraneous noncarbonaceous materials mentioned above at a preferred range of particle size through the system. In that case, these solids withdrawn from the top bed of heater 25 along with ash may be elutriated and/or screened to remove the ash and thence returned to the system for reuse. An oxidizing gas may be supplied directly to reactor 2 to supply additional heat by partial combustion therein, if desired. Also, solid as well as gaseous reactants may be preheated to any desired temperature, particularly for the purpose of starting-up the process.

The system illustrated in Fig. 2 may also be readily adapted to the carbonization of distillable carbonaceous materials in reactor 2. For this purpose, finely-divided carbonizable solids are subjected in reactor 2 to carbonization, in countercurrent flow with carbonization gases and a fluidizing gas, such as steam, supplied through line 7, at temperatures varying between about 800° and 2000° F., preferably between about 1200° and 1400° F. The heat required for the gasification reaction may be supplied by recirculating hot solids from heater 25 in a manner similar to that described above with reference to the gasification reaction. However, as a result of the largely fixed extremely high carbon content of the carbonization residue withdrawn from reactor 2, the advantage gained by concurrent flow of coke and oxidizing gas and the addition of inert material in the heater is less pronounced than in the case of the gasification reaction which yields residue of a rather flexible but usually very low carbon content. In the case of carbonization, therefore, conventional single-stage fluid heaters may be applied with satisfactory results.

It will be understood that my process can be applied to various operations in which reaction heat is supplied by circulating fluidized solids heated by the combustion of carbonaceous constituents of the circulating solids. My process is of particular advantage when the solids to be used as heat carriers have, prior to the combustion of their carbonaceous constituents, a carbon concentration of not more than about 5%, preferably not more than about 2%. In general, the initial carbon concentration of the solids subjected to combustion will be chosen the higher the greater the temperature difference between the temperature of the solids to be subjected to combustion and the desired temperature of the solid heat carrier withdrawn from the combustion zone. For instance, in the conversion of hydrocarbon gases by heat and/or steam under such conditions that carbon is deposited on the circulating solids, the heat is generated most efficiently by burning the carbon off the solids in an oxidizing gas in a concurrent manner, as described heretofore, in a heater of the type of vessel 25 in Fig. 2. Other applications as well, as for instance a similar conversion of liquid hydrocarbons, will be apparent.

The relative proportions of solid and gaseous reactants charged and the circulation rates of heat-carrying solids in all cases described above may vary within wide limits, depending on the type of materials charged, the reaction desired, and on the desired temperature gradients between heater 25 and reactor 2. For example, good results are obtained in the gasification to produce CO and $H_2$ when 20–300 lbs. of heat-carrying material is circulated per lb. of carbonaceous feed, whether solid, liquid, or gaseous. On the other hand, the carbonization of coal, the coking of otherwise useless residual oils, or the cracking of natural gas, for instance, may be carried out with circulation of 0.5–50 lbs. of hot solids per lb. of carbonaceous feed.

My invention will be further illustrated by the following specific example of water gas manufacture, using apparatus as shown in Fig. 2. To prepare 1,000,000 cu. ft./day of CO+$H_2$ in about 90% concentration in water gas, 16–20 tons per day of coal ground to about 50% through 50 mesh are charged to generator vessel 2 through line 1. 1,000 lbs. per minute of solids from heater vessel 25 are charged to the generator through lines 39 and 44 at an average temperature of 2000° F., the major portion, say 80%, being supplied through line 39. About 1200 lbs./hr. of steam, preheated by exchange with hot water gas from line 15 (in equipment not shown) is introduced through line 7, part of the preheat being supplied, if desired, by cooler 50 via line 52. Temperature resulting in the generator vessel thereby is about 1800° F., whereby about 1,100,000 cu. ft./day of water gas containing about 50% $H_2$ and 40% CO is withdrawn through line 15. If the water gas is to be used under sufficient pressure, I find it convenient and economical to maintain, for instance, 50 lbs. per sq. in. gauge pressure on generator 2. Slightly more than 1000 lbs./minute of hot solids containing about 0.6–0.7% carbon concentration are withdrawn through standpipe 16, suspended in 1000 cu. ft./minute of air introduced by line 18, having been preheated by exchange with flue gas in equipment not shown, and are conducted to the bottom of heater 25, which by virtue of its elevation above generator 2 may be held at a pressure of 35–45 lbs. per sq. in. Combustion of the carbonaceous content of the circulating solids reduces the carbon concentration as they progress upwardly to about 0.2%, and increases the temperature to about 2000° F. at the locations whence heating solids are removed through lines 42 and 38 to supply heat to the generator. Up to 200 lbs. of ash per day, depending on the ash content of the feed and losses in the make and flue gases, are withdrawn through line 40 to maintain suitable levels in the system, and small amounts, e. g., up to 50 lbs. per minute, of low-carbon solids are circulated through cooler 50 as necessary to maintain thermal equilibrium in the system, with the aid of up to 10 cu. ft. per minute of air introduced through line 48.

While the foregoing description and exemplary operations have served to illustrate specific applications and results of my invention, other modifications obvious to those skilled in the art are within the scope of my invention. Only such limitations should be imposed on my invention as are indicated in the appended claims.

I claim:

1. The method of producing gaseous fuels from solid carbonaceous materials, which comprises maintaining finely divided solid carbonaceous materials in a vertical elongated conversion zone in a series of beds of dense, ebullient, fluidized condition by an upwardly flowing gas under reaction conditions suitable for the production of gaseous fuels therefrom, feeding finely divided solid carbonaceous material to the upper portion of said conversion zone, withdrawing fluidized relatively spent low carbon solids from a lower portion of said conversion zone, regulating the free circulation of solids within said fluidized beds essentially in a vertical direction downwardly from the upper high carbon portion of said conversion zone to the lower low carbon containing portion of said conversion zone, subjecting the carbonaceous constituents of said withdrawn solids to combustion with a combustion-supporting gas in a vertical elongated combustion zone, maintaining in said combustion zone a plurality of separate superimposed dense, turbulent fluidized solids beds, maintaining a relatively high carbon concentration in a lower one of said solids beds and a relatively low carbon concentration in a higher one of said solids beds, passing said withdrawn solids to said lower solids bed, supplying said combustion-supporting gas to said lower solids bed to support combustion therein, passing combustion gases and entrained low carbon solids from said lower to said higher solids bed at conditions suitable for converting substantially all of the CO produced to $CO_2$, passing combustion residue from said lower solids bed substantially at the temperature of the latter to said lower portion of said conversion zone and combustion residue from said upper solids bed substantially at the temperature of the latter to said upper portion of said conversion zone to supply heat required in said portions.

2. The process of claim 1 in which said carbonaceous material is carbonizable and said conversion zone is a coking zone.

3. The process of claim 1 in which said first mentioned gas comprises steam and said conversion zone is a gasification zone for the production of $H_2$ and CO.

EDWIN J. GOHR.

REFERENCES CITED

The following references are of record in the file of this patent:

UNITED STATES PATENTS

| Number | Name | Date |
|---|---|---|
| 1,687,118 | Winkler | Oct. 9, 1928 |
| 1,898,967 | Schneider et al. | Feb. 21, 1933 |
| 2,379,408 | Arveson | July 3, 1945 |
| 2,425,098 | Kassel | Aug. 5, 1947 |
| 2,433,798 | Voorhees | Dec. 30, 1947 |
| 2,436,938 | Scharmann et al. | Mar. 2, 1948 |
| 2,443,714 | Arveson | June 22, 1948 |
| 2,444,990 | Hemminger | July 13, 1948 |
| 2,445,327 | Keith | July 20, 1948 |
| 2,447,116 | Collins | Aug. 17, 1948 |
| 2,480,670 | Peck | Aug. 30, 1949 |

FOREIGN PATENTS

| Number | Country | Date |
|---|---|---|
| 605,027 | Germany | Nov. 2, 1934 |
| 189,542 | Great Britain | Dec. 1, 1922 |